(12) United States Patent
Walstrom et al.

(10) Patent No.: US 8,181,983 B2
(45) Date of Patent: May 22, 2012

(54) VERTICALLY ADJUSTABLE MOUNT FOR JACK ASSEMBLY

(75) Inventors: Todd Walstrom, Weston, WI (US); Michael Murphy, Wausau, WI (US); Frank Drake, Wausau, WI (US)

(73) Assignee: Cequent Trailer Products, Mosinee, WI (US)

( * ) Notice: Subject to any disclaimer, the term of this patent is extended or adjusted under 35 U.S.C. 154(b) by 349 days.

(21) Appl. No.: 12/558,176

(22) Filed: Sep. 11, 2009

(65) Prior Publication Data

US 2010/0133783 A1    Jun. 3, 2010

Related U.S. Application Data

(60) Provisional application No. 61/191,683, filed on Sep. 11, 2008.

(51) Int. Cl.
*B60D 1/66* (2006.01)
*B60S 9/04* (2006.01)

(52) U.S. Cl. ...... 280/475; 254/419; 254/420; 280/763.1

(58) Field of Classification Search .................. 280/475, 280/477, 490.1, 763.1, 764.1, 765.1, 766.1, 280/767; 254/418–422
See application file for complete search history.

(56) References Cited

U.S. PATENT DOCUMENTS

| | | | |
|---|---|---|---|
| 2,712,453 A | 7/1955 | Dion | |
| 3,595,527 A | 7/1971 | Douglass | |
| 3,934,852 A | 1/1976 | Weber et al. | |
| 4,176,824 A | 12/1979 | Linton et al. | |
| 4,188,049 A | 2/1980 | Kimbro | |
| 4,238,113 A | 12/1980 | Adams | |
| 4,265,429 A * | 5/1981 | Formhals | 254/100 |
| 4,623,125 A * | 11/1986 | Ebey | 254/420 |
| 4,702,458 A | 10/1987 | Kendrick | |
| 4,796,864 A | 1/1989 | Wilson | |
| 4,842,252 A | 6/1989 | McMahan | |
| 4,978,104 A | 12/1990 | Gipson, Jr. | |
| 5,174,550 A | 12/1992 | Pittman | |
| 5,282,605 A * | 2/1994 | Sauber | 254/420 |
| 5,421,555 A | 6/1995 | Sims | |
| 5,579,862 A | 12/1996 | Bowden et al. | |
| 6,213,491 B1 * | 4/2001 | Southard, Jr. | 280/475 |
| 6,302,381 B1 * | 10/2001 | Roll | 254/425 |
| 6,607,183 B1 * | 8/2003 | White et al. | 254/420 |
| 7,192,011 B2 | 3/2007 | Meissner | |
| 2004/0159826 A1 * | 8/2004 | Peschmann et al. | 254/420 |
| 2009/0057633 A1 * | 3/2009 | Beck et al. | 254/420 |

* cited by examiner

Primary Examiner — Anne Marie M Boehler
(74) Attorney, Agent, or Firm — McDonald Hopkins LLC

(57) ABSTRACT

A jack assembly for adjusting the height of a trailer is provided. The jack assembly is moveable between an operable and a stowed position. The assembly includes a tube having a slot portion and a slide block moveable within the slot portion. A post connected to the slide block protrudes through an opening in the slot portion to engage a clamping mechanism. The clamping mechanism is movable between a clamped position where the slide block is clamped to the tube to prevent the jack from moving, and an unclamped position where the slide block is movable within the slot portion to allow the jack assembly to be moved between an operable position and a stowed position.

19 Claims, 13 Drawing Sheets

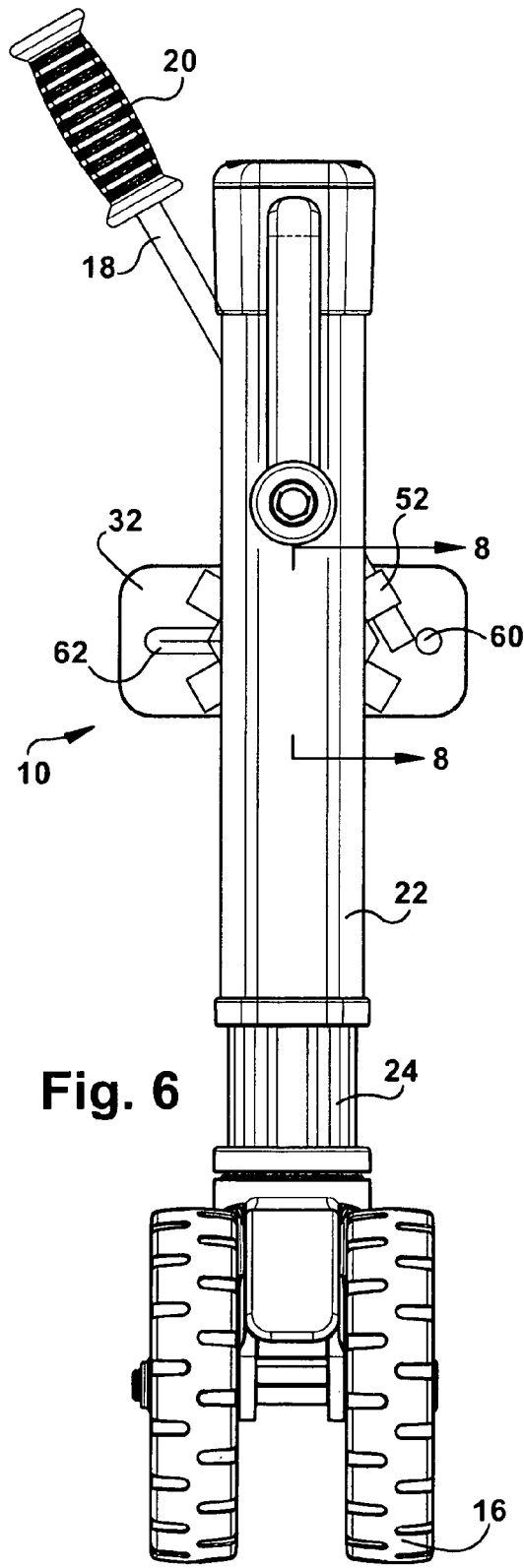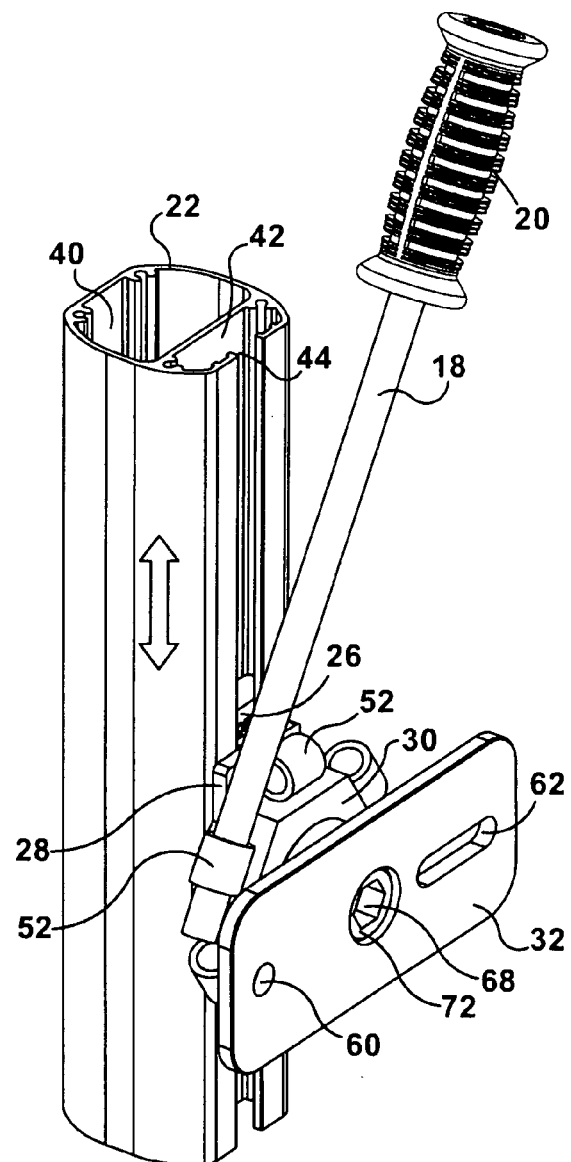

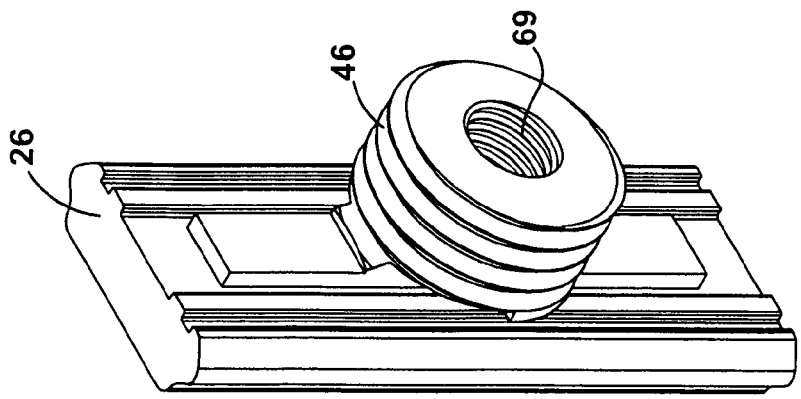
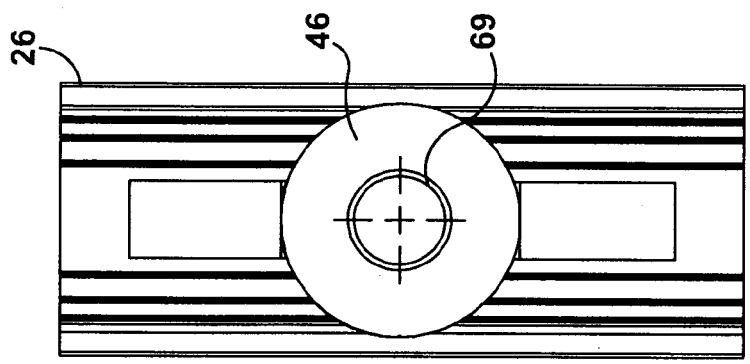
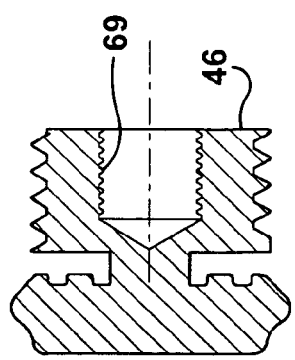
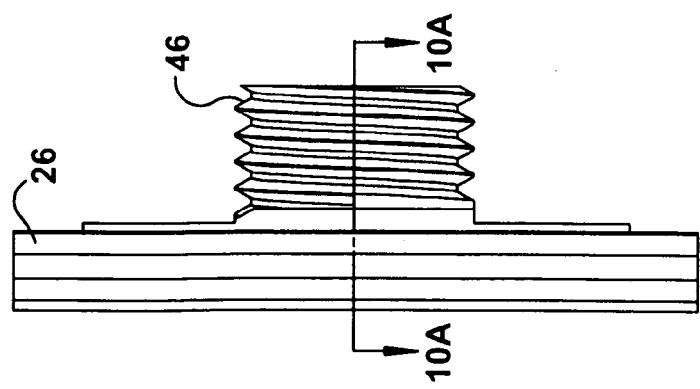

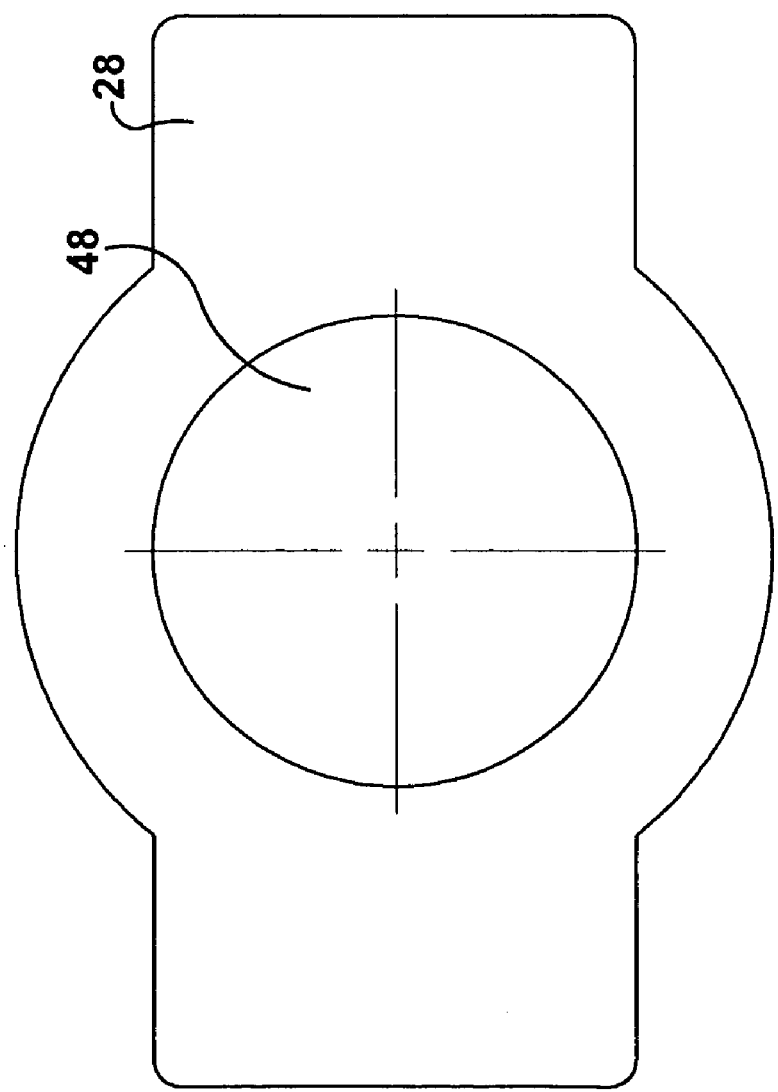

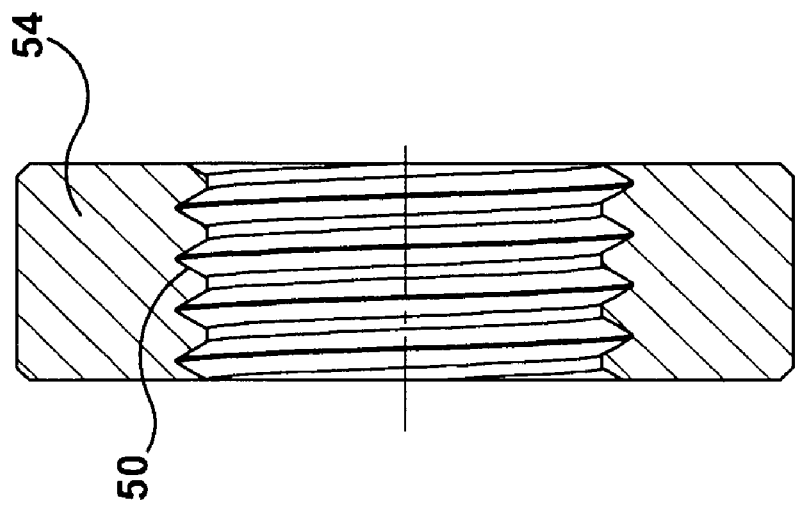
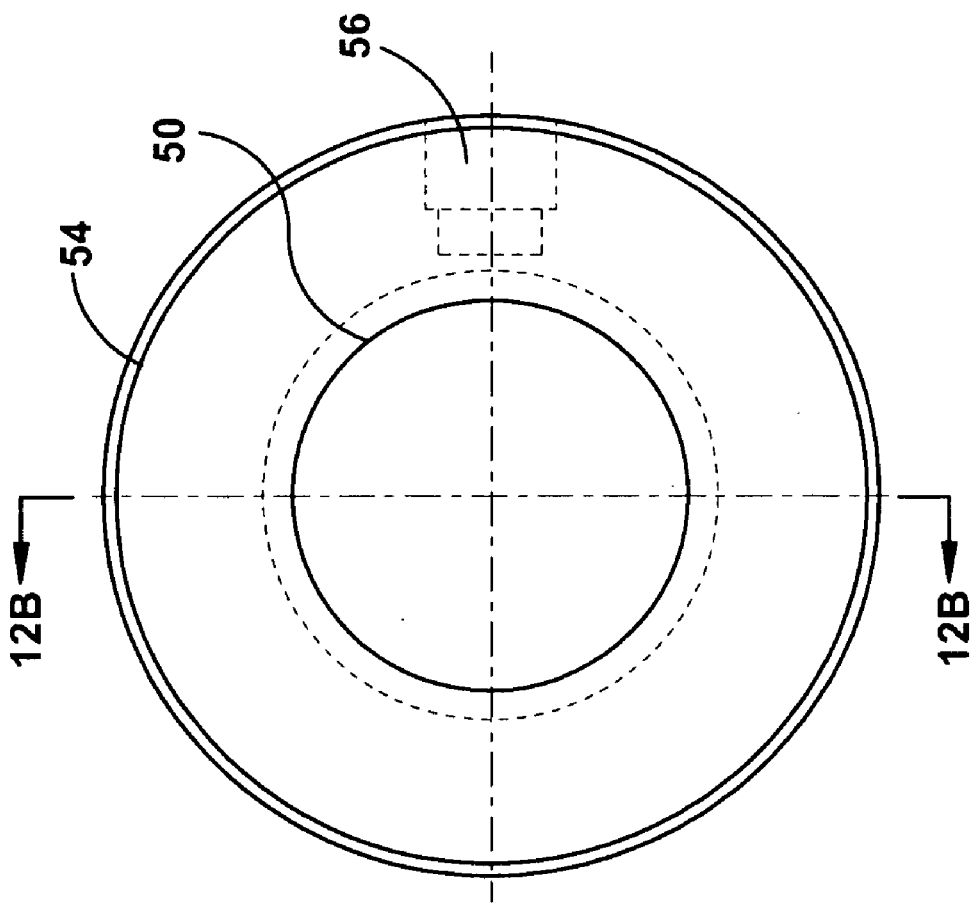

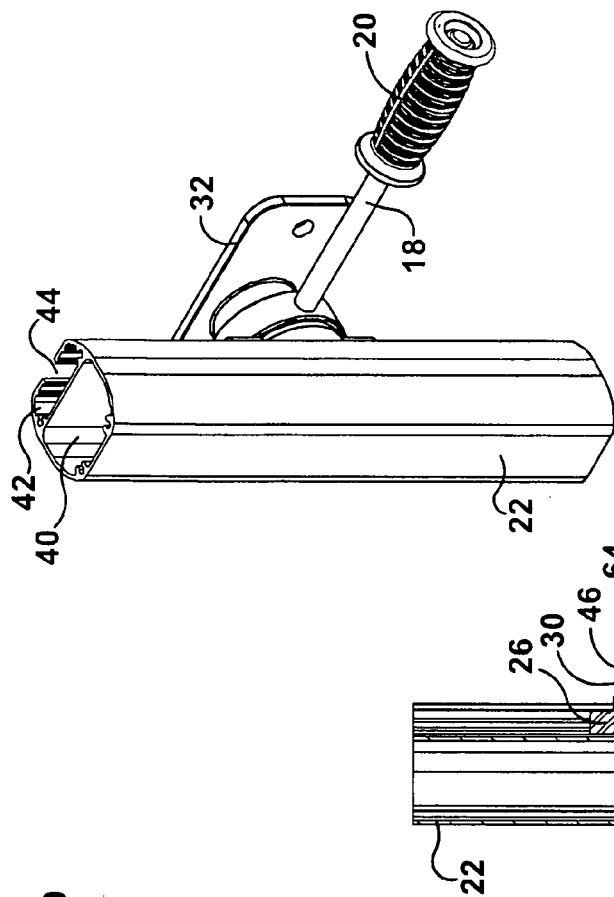
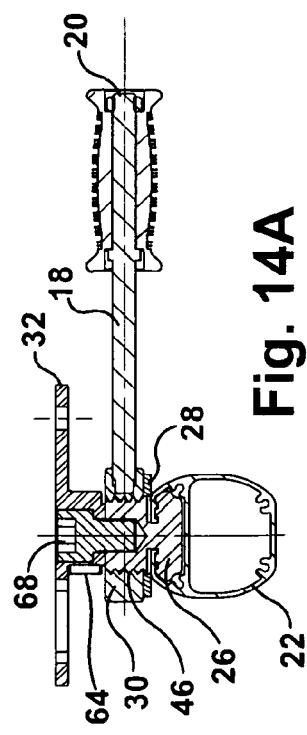
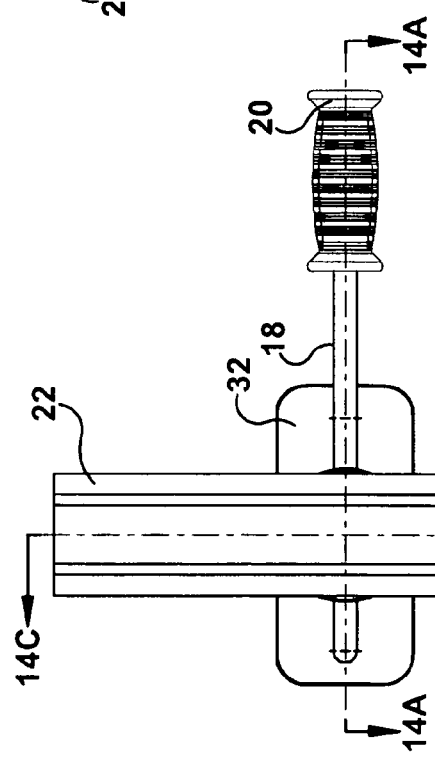

VERTICALLY ADJUSTABLE MOUNT FOR JACK ASSEMBLY

CROSS-REFERENCE TO RELATED APPLICATION

This application claims benefit from U.S. Provisional Patent Application No. 61/191,683, entitled "Vertically Adjustable Mount For Jack Assembly," filed on Sep. 11, 2008, which is hereby incorporated in its entirety by reference.

FIELD OF INVENTION

The present invention relates generally to adjustable jack assemblies. More particularly, this invention is directed to methods and apparatus for vertically adjusting a jack assembly between operative and stowed positions.

BACKGROUND

Jacks and jack assemblies have long been used with towing trailers. Typically, a jack assembly is secured to a towing trailer and assists in stabilizing the towing trailer while the trailer is detached from the towing vehicle. For example the jack assembly may support the towing trailer in a level position when the trailer is disengaged from the towing vehicle by elevating one end of the trailer off the ground. In addition, the jack assembly may be used to assist in engaging the towing trailer with the towing vehicle or disengaging the towing trailer from the towing vehicle. For example, the jack assembly may be utilized to change the vertical position or height of the tongue of the trailer as the tongue is mounted onto or dismounted from the hitch of the towing vehicle.

Such jack assemblies are commonly pivotally mounted onto the trailer tongue so as to be pivotally moveable between a vertical position and a horizontal position. The horizontal position often allows the jack assembly to be stowed when the jack assembly is not in use. However, not all trailers are arranged to allow for pivotal movement of a jack assembly. For such trailers, a pivot mount jack assembly is not practical and may limit the use of the towing trailer.

SUMMARY OF THE PRESENT INVENTION

Apparatus and methods of vertically adjusting the position of a jack assembly are provided. In one embodiment, the jack assembly is coupled to a towing trailer and is arranged so that it may be vertically positioned with respect to the trailer. The jack assembly is arranged to be selectively secured in an operative position where a portion of the jack assembly, such as a wheel, is in contact with the ground so that the jack assembly supports the towing trailer. The jack assembly is also arranged to be selectively secured in a stowed position where the jack assembly is positioned safely above the ground to avoid any contact with the ground or obstacles on the ground as the towing trailing is being pulled by a towing vehicle.

BRIEF DESCRIPTION OF THE SEVERAL VIEWS OF THE DRAWINGS

Objects and advantages together with the operation of the invention may be better understood by reference to the detailed description taken in connection with the following illustrations, wherein:

FIG. 6 is a front view of a jack assembly;

FIG. 7 is a perspective view of a portion of a jack assembly;

FIGS. 10A-10D are view of a slide block for a jack assembly;

FIGS. 11A and 11B are views of a clamping washer for a jack assembly;

FIGS. 12A and 12B are view of a clamping nut for a jack assembly;

FIGS. 14A-14D are views of partial jack assemblies.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the present invention.

Disclosed herein are apparatus and methods for vertically adjusting the position of a jack assembly. Such apparatus and methods provide a jack assembly moveable between an operative position and a stowed position. An example of an operative position is where the jack assembly is secured to a towing trailer and a portion of the jack assembly, such as the wheel, is in contact with the ground as to support the trailer in a generally horizontal position. An example of a stowed position is where the trailer assembly is positioned so that no part of the trailer assembly is in contact with the ground. Such positioning allows for a trailer to be towed without the jack assembly interfering with the towing by contacting the ground or obstacles on the ground.

Figure 1:
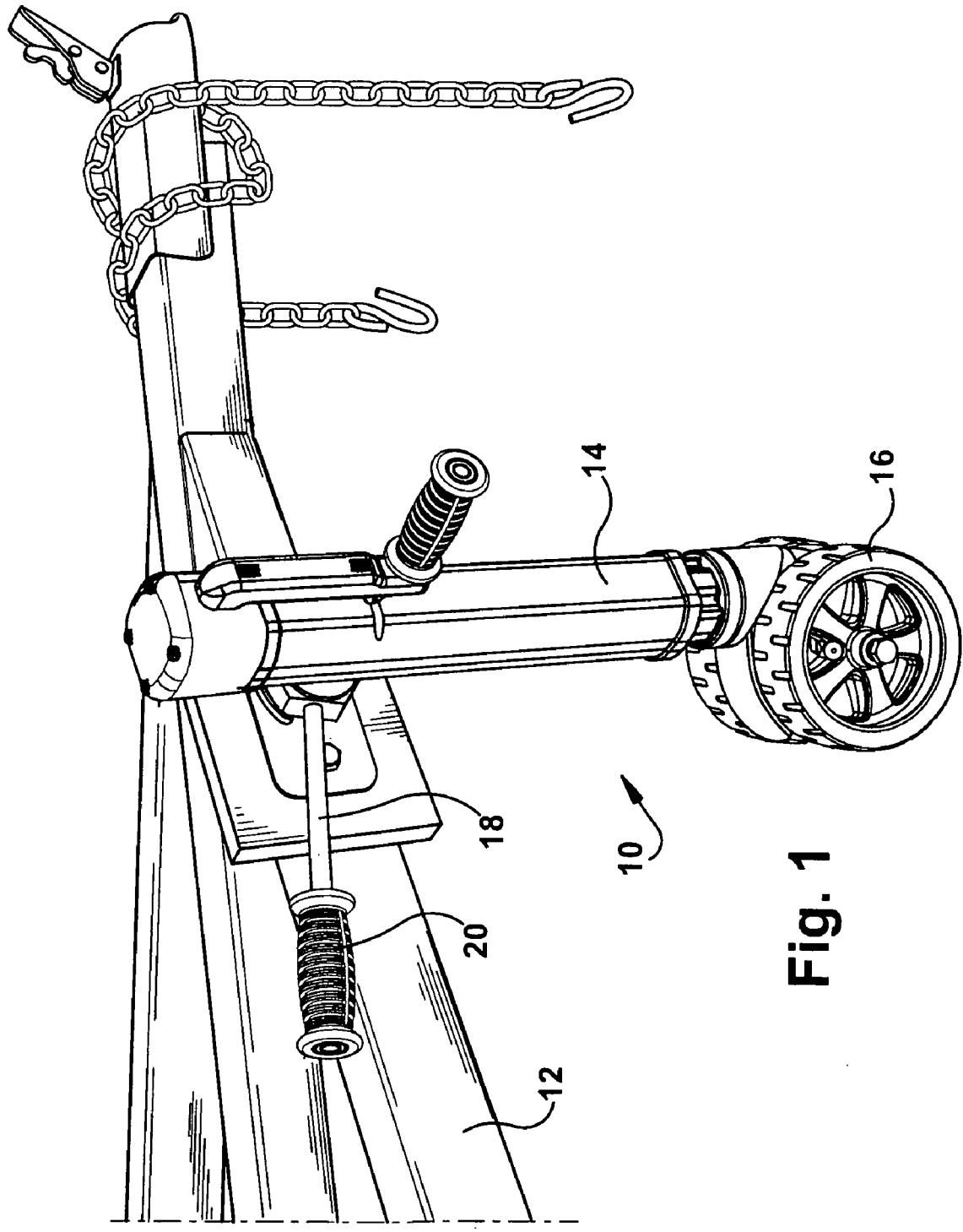
FIG. 1 is a perspective view of a jack assembly secured to a towing trailer, where the jack assembly is in an operative position.
Figure 2:
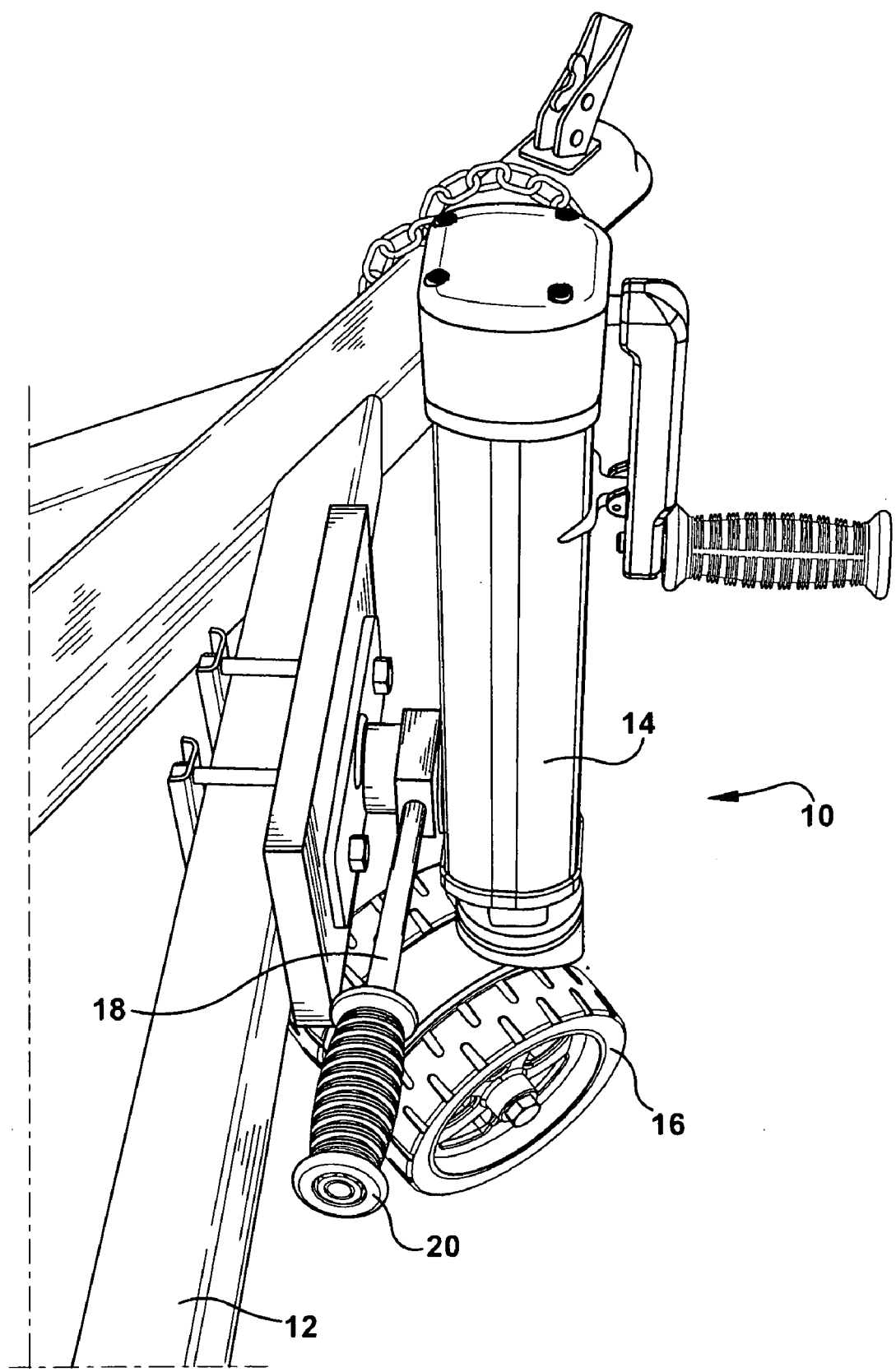
FIG. 2 is a perspective view of a jack assembly secured to a towing trailer, where the jack assembly is in a stowed position.

In an embodiment, a jack assembly is moved vertically, i.e., parallel to the axis of the jack body, to move the jack assembly between an operative and stowed position. In FIG. 1, a jack assembly 10 is illustrated in an operative position. The jack assembly 10 is secured to a towing trailer 12 and positioned to support the trailer 12. The jack assembly 10 is positioned so that the jack body 14 is maintained vertically, i.e., perpendicular to the ground, and support wheels 16 of the jack assembly 10 are in contact with the ground. It will be understood that such an arrangement of the jack assembly 10 is an operative position where the jack 10 supports one end of the trailer 12 above the ground. In FIG. 2, the jack assembly 10 is illustrated in a stowed position. The jack assembly 10 has been moved vertically as compared to the positioning in FIG. 1 and secured so that the wheels 16 are positioned well above the ground. In such a stowed position, the trailer may be safely towed along a roadway without the jack assembly 10 contacting the road or any obstacles on the road.

It will be understood that although only two positions are shown for the jack assembly 10, a jack assembly 10 may be positioned in numerous vertical positions with respect to the trailer 12 depending on the desired application. It will additionally be understood that the term operative positions many include a number of different vertical positions or mount heights, and the term stowed position may include a number of different vertical positions of mount heights. A user or operator of the jack assembly 10 may select or determine such mount heights based on the circumstances and needs of the operator. Furthermore, although the jack assembly 10 is shown and described as secured to a towing trailer 12 a jack assembly may be utilized for a variety of applications and with a variety of equipment and components.

The jack assembly 10 includes a lever 18 arranged to lock and release a locking mechanism that selectively secures the jack assembly 10 so that the jack 10 cannot be moved vertically with respect to the trailer 12. As will be describe in greater detail below, portions of the jack assembly 10 do not move relative to the trailer 12. For example the locking mechanism and a mounting plate are stationary with regard to the trailer 12 while components such as the jack body 14 and wheels 16 to move with respect to the trailer 12.

Figure 3:
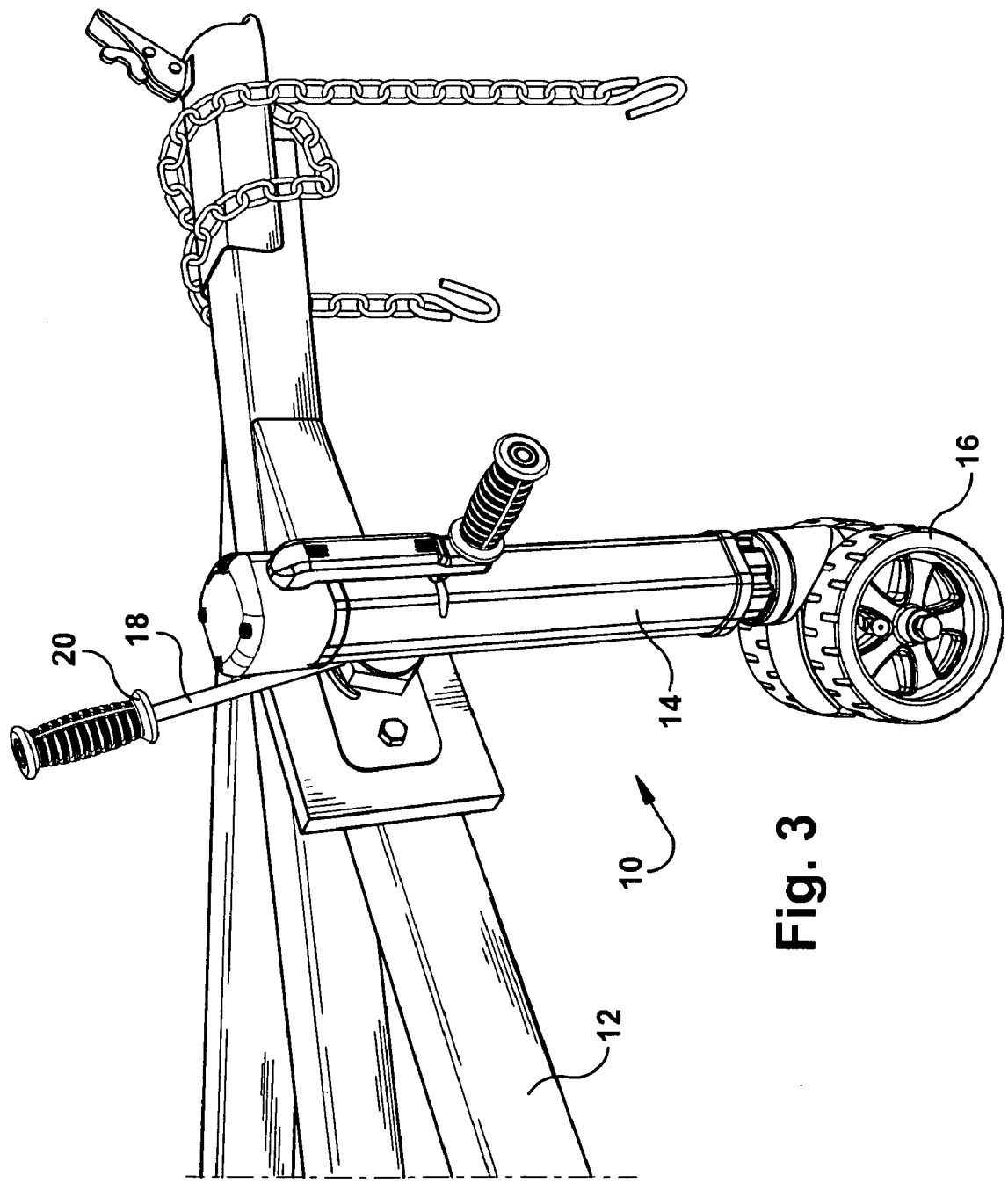
FIG. 3 is a perspective view of a jack assembly secured to a towing trailer, where the locking mechanism is disengaged.

With respect to FIGS. 1 and 2, the lever 18 is shown in the position that locks the jack assembly 10 to prevent vertical movement. In such a position, the jack assembly 10 may not be moved between operative and stowed positions. With regard to FIG. 3, the lever 18 is shown in a position that releases the locking mechanism so that the jack assembly 10 may be moved between operative and stowed positions. As may be seen, in one embodiment, the locking mechanism may be moved from a locked position to a released position by rotating the lever 18 approximately 90 degrees. A jack operator may rotate the lever 18 manually, and a grip 20 may be included at the end of the lever 18 to facilitate such manual rotation. Once the lever 18 is rotated to release the locking mechanism, the jack operator may manually move the jack assembly 10 up or down to move from an operative position to a stowed position or from a stowed position to an operative position. The jack operator may then again rotate the lever 18 to actuate the locking mechanism and lock the jack assembly 10 in the desired position or mount height. Although the figures and description disclose a lever rotating 90 degrees to engage and disengage a locking mechanism, it will be understood that a locking mechanism may engaged and disengaged by a variety of methods such as, for example, a pin and aperture arrangement, a ratchet mechanism, an the like. Also, a locking mechanism may be arranged so that any amount of rotation of a lever may move the locking mechanism between an engaged and disengaged state.

FIGS. 4 through 14 illustrate details of an exemplary jack assembly 10. In an embodiment, the jack assembly 10 includes an outer tube 22, an inner tube 24, a slide block 26, a clamping washer 28, a clamping nut 30, a mounting plate 32, the lever 18, and the grip 20. As will be described in greater detail below, such components may work in concert to selectively lock a jack assembly 10 in a position and selectively release the jack assembly 10 so that it may be moved between desired positions. For example, in one embodiment, the slide block 26, the clamping washer 28, the clamping nut 30, and the lever 18 collectively form a locking mechanism.

Figure 9C:
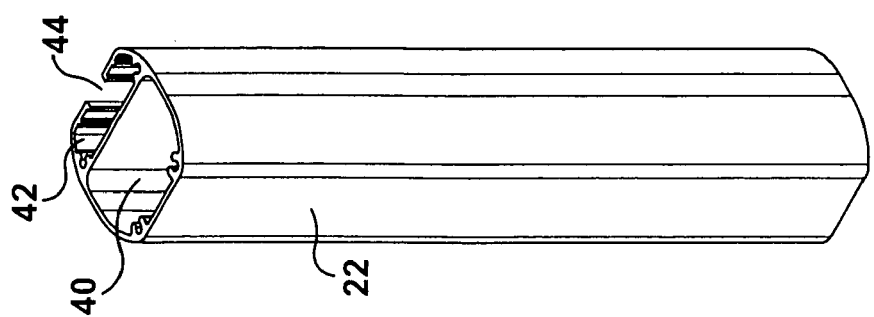
FIGS. 9A-9C are views of an outer tube for a jack assembly.
Figure 9B:
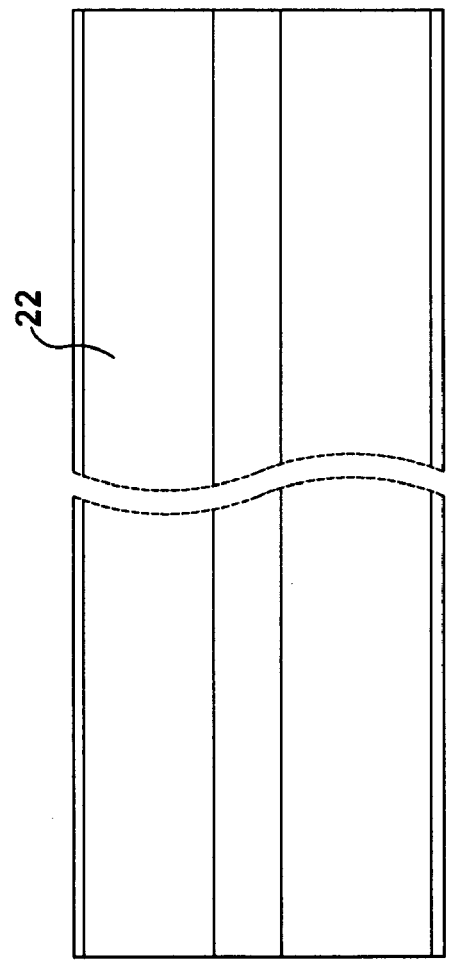
Figure 9A:
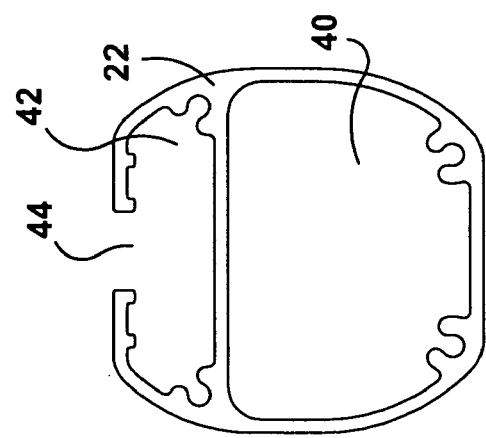

As illustrated in FIGS. 9A-9C, the outer tube 22 includes a central passage 40 arranged to accommodate the inner tube 24. The inner tube 24 may be connected to the wheel 16 and movable, such as telescopically moveable, with respect to the outer tube 22. For example, the jack assembly 10 may include components commonly known in the art to facilitate movement of the inner tube 24 with respect to the outer tube 22 such as an electric motor or gears. It will be appreciated, however that the jack assembly 10 may include any components to facilitate the movement of the inner tube 24 and wheel 16 with respect to the outer tube 22

Figure 8:
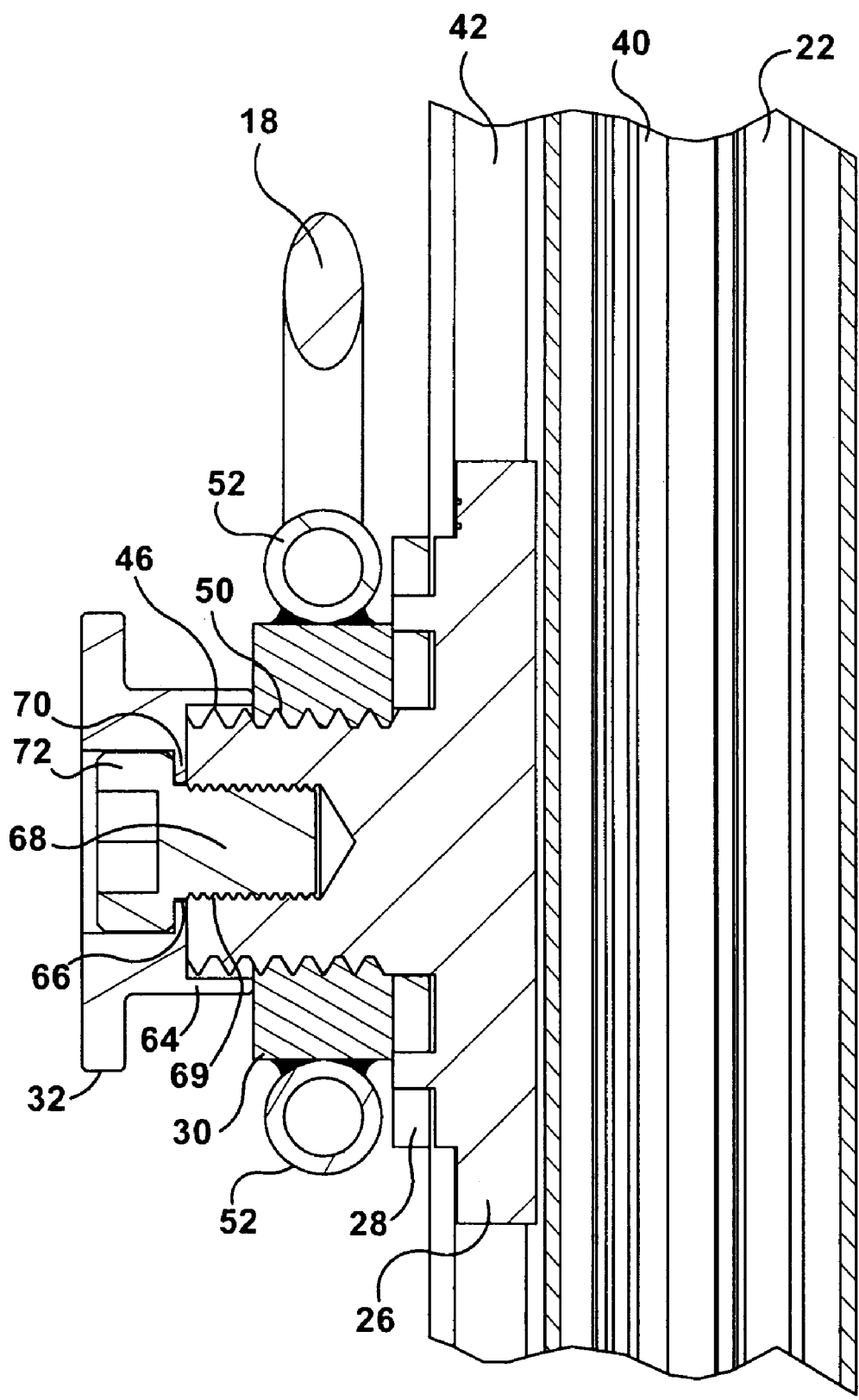
FIG. 8 is a cross-sectional view of a jack assembly taken along the line 8-8 or FIG. 6.

The outer tube 22 includes a slot 42 having an opening 44 and arranged to accommodate the slide block 26. The slide block 26 is sized and shaped so that it may generally slide freely in the vertical direction within the slot 42 of the outer tube 22. In one embodiment, an extrusion process is utilized to manufacture the outer tube 22. As illustrated in FIGS. 10A-10D, the slide block 26 includes a threaded post 46. The threaded post 46 extends through the opening 44 of the slot 42 when the slide block 26 is positioned within the slot 42 (as best seen in FIG. 8). As illustrated in FIGS. 11A and 11B, the clamping washer 28 includes an aperture 48. The clamping washer 28 is assembled to the jack assembly 10 by passing the treaded post 46 of the slide block 26 through the aperture 48 of the washer 28. In such an arrangement, one surface of the washer 28 is placed in contact with an outer surface of the outer tube 22.

As illustrated in FIGS. 12A and 12B, the clamping nut 30 includes a threaded inner bore 50 and a number of tubular collars 52 positioned around the perimeter of the nut 30. The clamping nut 30 is threaded onto the treaded post 46 of the slide block 26. As will be understood, as the clamping nut 30 is threaded onto the threaded post 46, the clamping nut 30 contacts the clamping washer 28 to force the clamping washer 28 towards the slide block 26. Such an arrangement applies a clamping force to the outer tube 22 by the clamping the outer tube 22 between the clamping washer 28 and the slide block 26. Such clamping force may be sufficient to lock the slide block 26 and clamping washer 28 to the outer tube 22 of the jack assembly 10. As will be described further below, such an arrangement may be used to lock the jack assembly 10 in either an operative or stowed position. Because the clamping force may be relatively large, the positioning of the clamping washer 28 serves the function of protecting the outer tube 22 from damage due to this clamping force. It will be understood that the jack assembly 10 may be assembled without a clamping washer 28, where the clamping nut 30 directly engages the outer tube 22 to apply the clamping force.

The lever 18 may be inserted into one of the collars 52 so that the lever 18 may be used to rotate the clamping nut 30 in a first direction to increase the clamping force or rotate the clamping nut 30 in a second and opposite direction to decrease the clamping force. It will be understood that using a lever 18 may allow the jack operator to manually apply sufficient torque on the clamping nut 30 to lock or release the jack assembly 10. In addition, the lever 18 may optionally be designed either longer or shorter than shown to meet the torque requirements for different embodiments of a jack assembly 10. Although the clamping nut 30 is shown and described as having a number of collars 52 positioned around its perimeter, other embodiments may include a variety of different methods for attaching a lever to a clamping nut. For example, as shown in FIGS. 12A and 12B, a clamping nut 54 may include an aperture 56 in the side of the nut 54. Such an aperture 56 may accommodate the insertion of an end of a lever, which may be used to apply torque to the nut 54. In addition, an aperture may be optionally threaded so that a lever with a matting threaded end may be rotationally inserted into the threaded aperture to reversibly secure the lever to the clamping nut. It will also be understood that a lever may be arranged to be rigidly attached to a claming nut through methods such as welding, a lever may be reversibly attached to a clamping nut through methods such as threaded engagement, or a lever may be readily detachable from a clamping nut through methods such as insertion an end of the lever into a collar.

Figure 4:
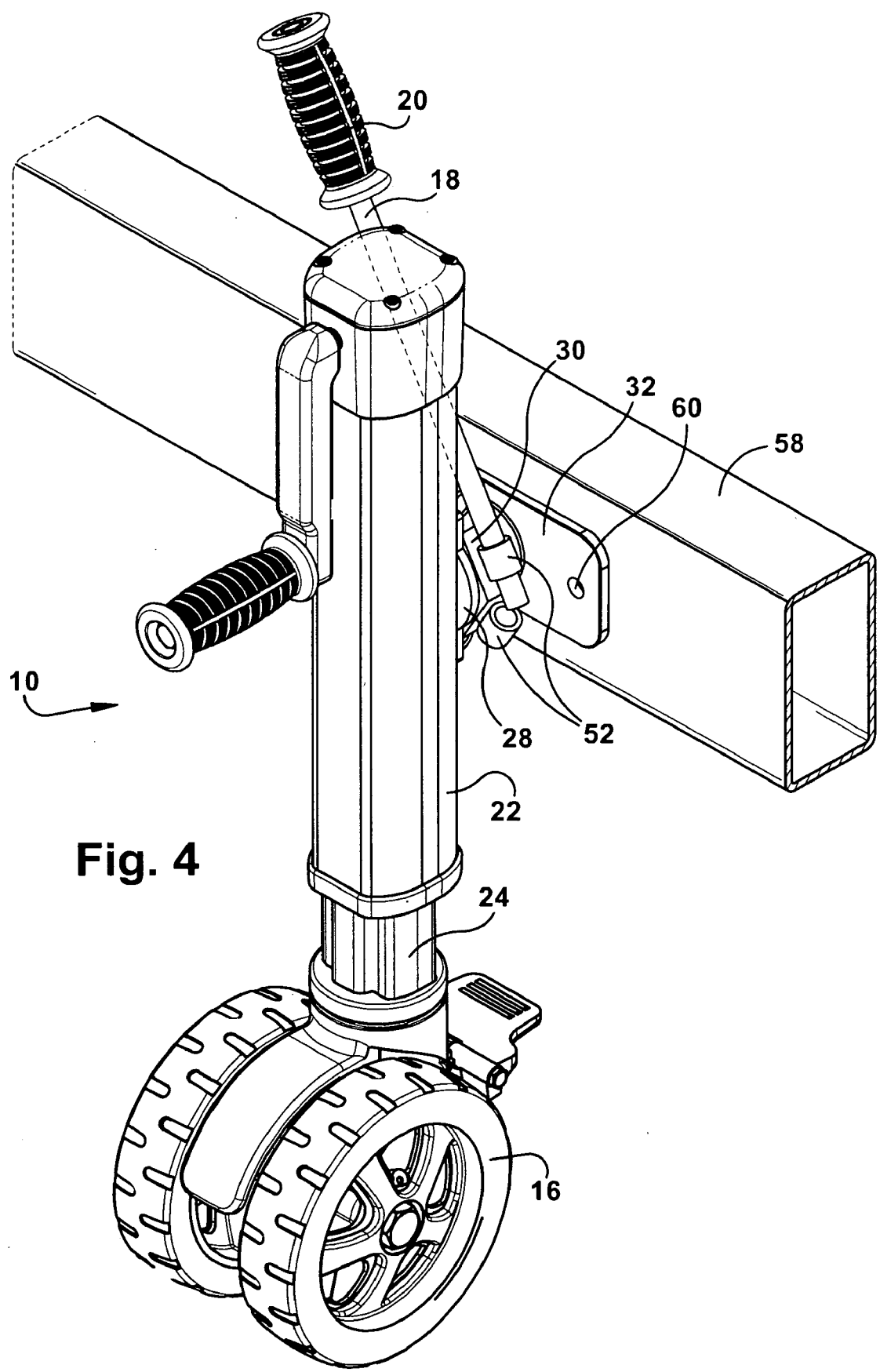
FIG. 4 is a perspective view of a jack assembly.
Figure 5:
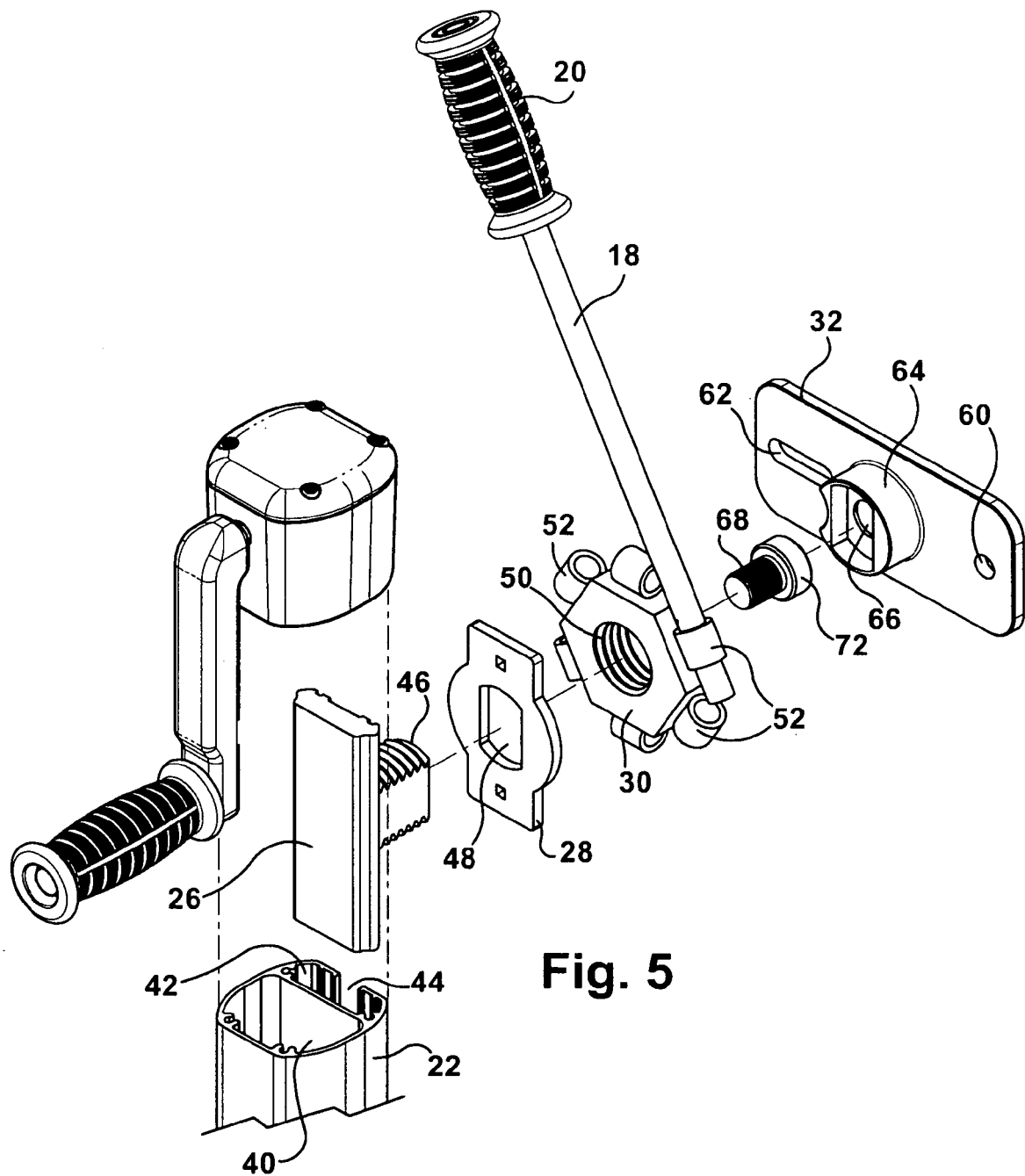
FIG. 5 is an exploded view of a portion of a jack assembly.
Figure 13B:
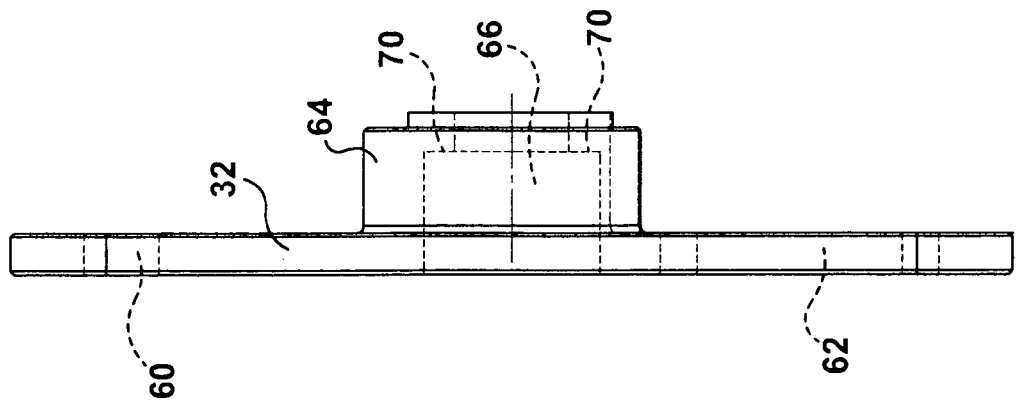
FIGS. 13A and 13B are view of a mounting plate for a jack assembly.
Figure 13A:
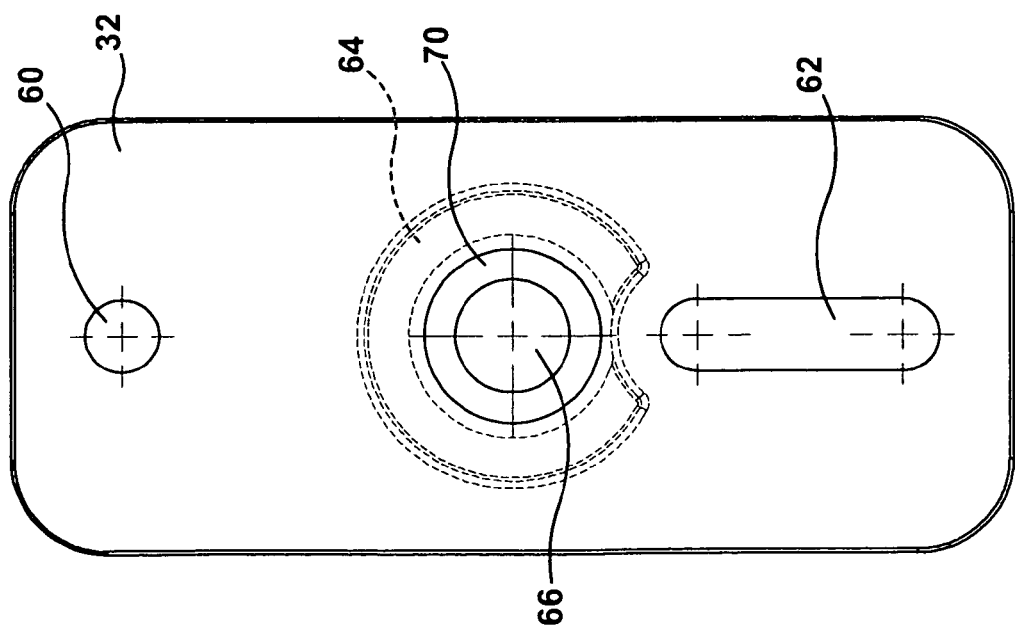

The mounting plate 32 is utilized to secure the jack assembly 10 to a trailer frame member 58 as shown in FIG. 4. As illustrated in FIGS. 13A and 13B, the mounting plate 32 includes an aperture 60 and a slot 62 to facilitate securing the plate 32 to a trailer frame member 58. Bolts, screws, rivets, or other such fasteners may be passed through the aperture 60 and slot 62 and into the frame member 58 to secure the plate 32 to the frame 58. It will be understood that the slot 62 may facilitate the horizontal adjustment of the plate 32 to accommodate a variety of bolt patterns for a variety of trailers.

The mounting plate 32 also includes a collar 64 extending from the plate 32 with an opening 66 passing through the collar 64. The plate 32 is secured to the remainder of the jack assembly 10 via the collar 64 and a cap screw 68 passing through the opening 66. As best seen in FIG. 8, a portion of the threaded post 46 of the slide block 26 extends past the clamping washer 28 and clamping nut 30. This extending portion of the post 46 may be positioned within the collar 62 of the mounting plate 32. In such a position, the cap screw 68 may be passed through the opening 66 in the plate 32 and secured into a threaded bore 69 of the slide block 26. The opening 66 includes a shoulder 70 with which a head 72 of the cap screw 68 may engage to secure the plate 32 to the slide block 26, and thus, engage the plate 32 to the remainder of the jack assembly 10.

As will be understood, the embodiments described herein may be arranged to secure a jack assembly 10 to the frame 58 of a trailer 12 via the mounting plate 32. Once secured to a trailer 12, a jack operator may manually manipulate the lever 18 to vertically adjust the jack assembly 10 with respect to the trailer 12. Rotating the lever 18 in a first direction may apply a clamping force on the outer tube 22 to secure or lock the jack assembly 10 with respect to the trailer 12. The clamping force is sufficient to hold the jack assembly 10 in either a stowed or operative position. For example, when secured in a stowed position, the clamping force is sufficient to resist forces applied to the jack assembly 10 due to the trailer 12 being towed over uneven roadways at high speeds. When secured in the operative position, the clamping force is sufficient to resist the gravitational force applied to the jack 10 by the weight of the trailer and any cargo positioned on the trailer 12. Thus, the clamping force is sufficient for example to provide stable support for a trailer 12 that is decoupled from a towing vehicle. As will be understood, the clamping force produces friction forces between the outer tube 22 and the slide block 26 and the clamping washer 28, or alternatively, the clamping nut 30. These friction forces counteract and overcome forces, such as cargo and trailer weight, to safely lock the jack assembly 10 in place.

Manually rotating the lever 18 in a second direction, opposite of the first direction may release the jack assembly 10 from a secured state relative to the trailer 12. When the jack 10 is released, the jack 10 may be moved vertically with respect to the trailer 12 between an operative position and a stowed position. Once the jack 10 is positioned as desired, the lever 18 may again be rotated in the first direction to lock the jack assembly 10 in that desired position.

It will be understood that not all components of the jack assembly 10 are moveable with respect to the trailer 12 once the mounting plate 32 is secured to the trailer frame member 58. The plate 32, the slide block 26, the clamping washer 28, the clamping nut 30, and cap screw 68, remain generally stationary with respect to the trailer 12. However, the outer tube 22, inner tube 24, and wheels 16 are moveable with respect to the trailer 12.

It will be understood that the embodiments disclosed herein include both methods and apparatus for quickly and easily adjusting the vertical positioning of a jack assembly. Such adjusting may be done manually and without the need for any additional tools.

Although the preferred embodiment of the present invention has been illustrated in the accompanying drawings and described in the foregoing detailed description, it is to be understood that the present invention is not to be limited to just the preferred embodiment disclosed, but that the invention described herein is capable of numerous rearrangements, modifications and substitutions without departing from the scope of the claims hereafter.

Having thus described the invention, we claim:

1. A jack assembly comprising:
   a tube having a slot portion and an opening in said slot portion;
   a slide block positioned within said slot portion;
   a post connected to said slide block and protruding through said opening;
   a clamping mechanism connected to said post and moveable between a clamped position and an unclamped position, wherein said clamping mechanism includes a nut connected to said post and a lever connected to said nut;
   wherein in said unclamped position, said slide block is capable of moving within said slot portion; and
   wherein in said clamped position, said slide block is clamped to said tube to prevent said slide block from moving with respect to said tube.

2. The jack assembly of claim 1 further comprising a washer located between said clamping mechanism and said tube.

3. The jack assembly of claim 1, wherein said post and said nut are connected by a threaded engagement.

4. The jack assembly of claim 3, wherein said lever is movable in a first direction to place said clamping mechanism in clamped position and wherein said lever is movable in a second direction to place said clamping mechanism in said unclamped position.

5. The jack assembly of claim 4 wherein said lever is adjustably connected to said nut.

6. The jack assembly of claim 5 wherein said nut includes a plurality of collars configured to receive said lever.

7. The jack assembly of claim 5 wherein said lever is connected to said nut by a threaded engagement.

8. The jack assembly of claim 5 wherein said lever includes a grip.

9. A jack assembly comprising:
   a tube having a slot portion and an opening in said slot portion;
   a slide block positioned within said slot portion;
   a post connected to said slide block and protruding through said opening;
   a mounting plate connected to said post;
   a clamping mechanism connected to said post between said mounting plate and said tube, said clamping mechanism comprising:
      a nut connected to said post; and
      a lever connected to said nut;
   wherein said lever is moveable in a first direction to clamp said slide block to said tube and prevent said slide block from moving; and wherein said lever is moveable in a second direction to unclamp said slide block from said tube and allow said slide block to move with respect to said tube.

10. The jack assembly of claim 9 further comprising a bolt connecting said mounting plate to said post.

11. The jack assembly of claim 10 wherein said post includes a bore to receive said bolt.

12. The jack assembly of claim 9 wherein said mounting plate is connected to a trailer.

13. The jack assembly of claim 12 wherein said mounting plate includes a plurality of mounting apertures.

14. The jack assembly of claim 9 further comprising a washer disposed between said clamping mechanism and said tube.

15. A jack assembly comprising:
  a tube having a slot portion and an opening in said slot portion;
  an inner member positioned within said tube and telescopically movable with respect to said tube;
  a slide block positioned within said slot portion;
  a post connected to said slide block and protruding through said opening;
  a clamping mechanism connected to said post, said clamping mechanism comprising: a nut connected to said post; and a lever connected to said nut;
  wherein said lever is moveable in a first direction to clamp said slide block to said tube and prevent said slide block from moving with respect to said tube; and
  wherein said lever is moveable in a second direction to unclamp said slide block from said tube and allow said slide block to move with respect to said tube.

16. The jack assembly of claim 15 further comprising a wheel connected to said inner member.

17. The jack assembly of claim 15 further comprising a mounting plate connected to said post, wherein said clamping mechanism is disposed between said mounting plate and said tube.

18. The jack assembly of claim 15 wherein said jack assembly is connected to a trailer and said inner member is movable within said tube to adjust the height of said trailer.

19. The jack assembly of claim 18 further comprising a plurality of gears to facilitate movement of said inner member within said tube.

* * * * *